United States Patent [19]

Brown et al.

[11] 4,096,425

[45] Jun. 20, 1978

[54] SERVO SYSTEMS

[75] Inventors: Ian Francis Brown; Colin Keith Sharp, both of Edinburgh, Scotland

[73] Assignee: Ferranti Limited, Hollinwood, England

[21] Appl. No.: 680,779

[22] Filed: Apr. 27, 1976

Related U.S. Application Data

[63] Continuation of Ser. No. 507,420, Sep. 19, 1974, abandoned.

[51] Int. Cl.² .......................................... G05B 13/00
[52] U.S. Cl. ................................................. 318/561
[58] Field of Search ................. 318/561; 235/150.1; 364/105, 121, 424

[56] References Cited

U.S. PATENT DOCUMENTS 3,287,615  11/1966  Smyth .................................. 318/561

*Primary Examiner*—Robert K. Schaefer
*Assistant Examiner*—John J. Feldhaus
*Attorney, Agent, or Firm*—Cameron, Kerkam, Sutton, Stowell & Stowell

[57] ABSTRACT

A servo control system comprising, in a feedback loop, means for providing an error signal representing the difference between desired and actual conditions of a controlled system, and means responsive to said error signal to produce a control signal for the controlled system; the control system also comprising means for injecting a predetermined disturbance signal into the loop, and means responsive to a comparison of said disturbance signal and a loop response signal for varying gain in said loop.

9 Claims, 3 Drawing Figures

SERVO SYSTEMS

This is a continuation of application Ser. No. 507,420, filed Sept. 19, 1974, now abandoned.

This invention relates to servo control.

In some servo control systems large variations may occur in sensitivity of an element and/or gain of an amplifier, and present problems in compensation. One such system is a precision position control servo using floated single axis gyroscopes for position sensing, e.g. in an inertial platform of a navigation system. There the gyroscope sensitivity is dependant on temperature and wheel-speed and overall gain may vary by a factor of about 1,000.

According to one aspect of the invention a servo control system comprises, in a feedback loop, means for providing an error signal representing the difference between desired and actual conditions of a controlled system, and means responsive to said error signal to produce a control signal for the controlled system, the control system also comprising means for injecting a predetermined disturbance signal into the loop, and means responsive to a comparison of said disturbance signal and a loop response signal for varying gain in said loop.

Preferably the disturbance signal is periodic and its comparison with the loop response signal is at corresponding intervals. Successive such comparisons may drive an integrator for controlling the loop gain. A pulse disturbance signal may be used to control sampling the output of a comparator receiving the disturbance signal and the loop response signal.

The gain controlled by the disturbance signal comparison may be of a separate amplifier additional to that normally used for control signal generation.

According to another aspect of the invention a method of controlling a servo loop comprises injecting a temporary disturbance signal into the loop control signal, and varying the overall loop gain in accordance with a comparison of the disturbance signal and the resulting loop control signal.

Particular ways of putting the invention into effect will now be described, by way of example, with reference to the accompanying drawings, in which.

Figure 2:
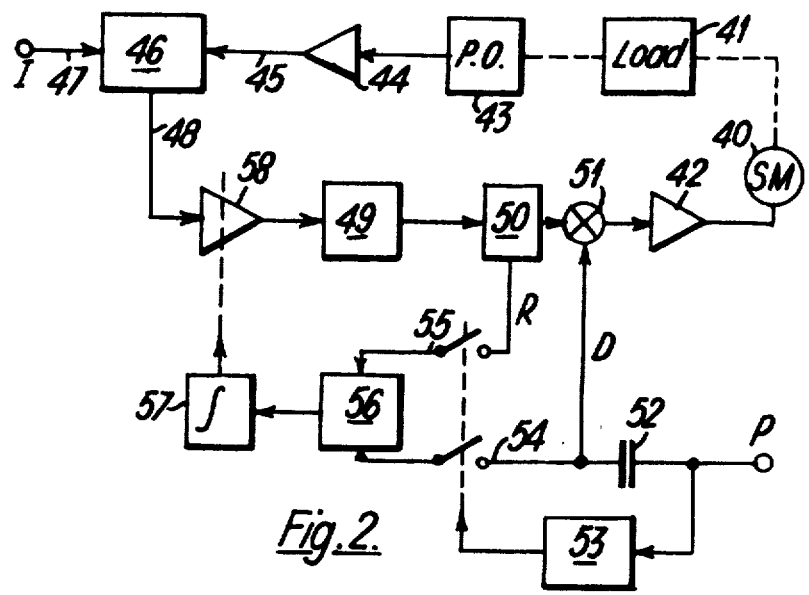
FIG. 2 is a block diagram of a servo control system.
Figure 3:
Figure 3:
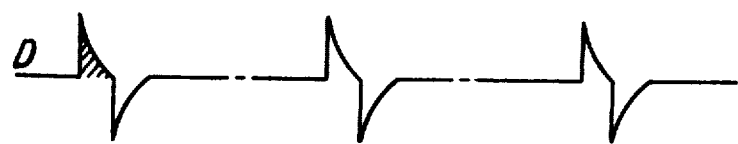
Figure 3:
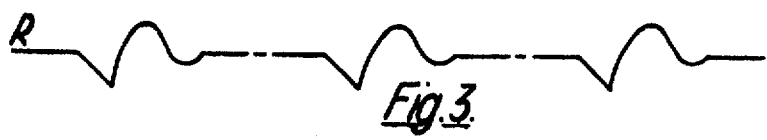

FIG. 3 shown idealised waveforms for the system of FIG. 2.

Figure 1:
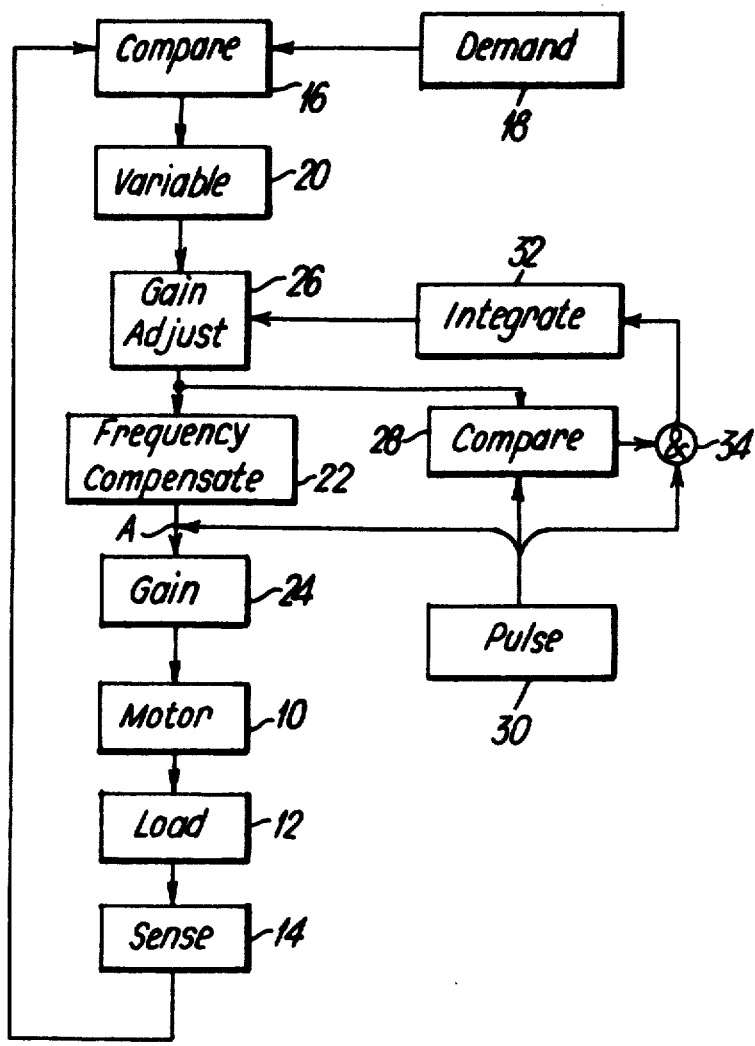
FIG. 1 is a flow diagram showing a method of servo control.

The flow diagram of FIG. 1 shows servo control via a motor 10 for driving a load 12 that constitutes at least part of the controlled system. The state of a parameter according to which the control is required is sensed at 14 and fed back to be compared at 16 with a demand 18 expressed in similar form to the sensed parameter.

The system is such that large variations of gain or sensitivity can take place and this is represented by the block 20 indicating that the results of the comparison operation are subject to variable scaling. Normally, the comparison result will be an electrical signal which will be frequency compensated, 22, in order to avoid positive feedback for particular frequency/phase components that may appear in the signal. Servo loop gain is then applied to produce a motor control signal as indicated at 24.

FIG. 1 also shows a method of adjusting the gain for the results of the comparison operation 16 so as to compensate for the variable gain indicated at 20. The application of further variable gain 26 is shown to be under the control of a comparison 28 of the results of the gain applied at 26 and a temporary disturbance injected into the servo control loop at a convenient point, shown at A as being immediately prior to the normal gain application 24 of the loop. The disturbance is repeatedly applied from a pulse source 30 having a predetermined repetition rate. Between disturbance pulses it is desired to maintain the variable gain 26 at a level set by the comparison 28 of the last applied pulse. The comparison result is integrated as indicated at 32 and updated for each applied pulse by coincidence gating 34 using the pulses themselves for enabling purposes.

The integrated control 32 applied to set the adjustable gain 26 will remain substantially constant from after successive pulses when the product of the variable scaling 20 and the adjustable gain 26 is constant. Then, the comparison 28 will indicate a predetermined relationship between the disturbance pulse and its effect on the servo loop. There will be a delay between the application of the disturbance pulse and settling of the response to it in the servo loop. The integrated value of the comparison will reflect this and, in a steady state condition for the variable 20, will have the same value at the end of the disturbance pulse as it had at the beginning. In other words, the effect of the disturbance pulse is then being corrected within the duration of the pulse indicating that no other substantial gain variation is taking place in the system.

In the block diagram of FIG. 2, a servomotor 40 drives a load 41 in accordance with the output of a power amplifier 42. A pick-off sensor and associated amplifier are shown at 43 and 44. One specific and advantageous application for the invention is to controlling a platform of an aircraft inertial navigation system. Then the servomotor 40 of FIG. 2 would be associated with one gimbal axis of the platform with single axis gyros used to give outputs representing angular displacement about gyro axes, which are usually different from the gimbal axes. Embodiments of the invention are, of course, equally applicable to two-axis gyros. The blocks 43 and 44 therefor may be taken as representing gyro pick-offs and resolving system for providing displacement signals in the gimbal axis. Only that gimbal axis displacement signal output 45 appropriate to the servomotor 40 is shown in FIG. 2 applied to one input of a comparator 46. The comparator 46 also has an input 47 for a signal representative of a desired angular displacement for the platform in the gimbal axis concerned. An output from the comparator over line 48 represents a net displacement in accordance with which the servomotor 40 needs to be energised in order to maintain, or achieve, the desired platform orientation.

In such a system there is a large variability of gain or sensitivity. Gyros having a cased rotating wheel mounted in a viscous fluid usually depend mostly on viscous drag in the fluid between the wheel casing and the fluid contained. The proportionality of response to a given displacement is dependent on fluid viscosity which varies greatly with temperature and speed variations also contribute significantly. In total, all factors affecting sensitivity of the sensing system can give a variation of the order of 1000 times in terms of overall gain.

In an aircraft inertial navigation system, the resolved gyro outputs will be amplitude modulation a.c. signals, 15Hz carrier though the servomotor will be driven by a 400Hz signal. A demodulator 49 is therefore shown in the servo loop operative on the output of the comparator 46 to produce a d.c. demand signal for application to the power amplifier 42. This demodulator is shown in front of a frequency and phase compensating network 50 operative to avoid undue reaction to the particular frequency component that may be present in the servo loop response. A 400Hz modulator will normally precede the power amplifier 42.

The embodiment of the invention shown in FIG. 2 copes with large gain sensitivity variations by injecting disturbances into the servo loop. Pulses of predetermined rate and duration are made available at terminal P. They are differentiated and applied as bipolar distrubances D at a point 51 prior to the power amplifier 42. A capacitor shown at 52 is part of the differentiating means employed.

The servo loop response to the injected disturbance is taken off at any convenient point in the loop forward of its point of injection. The frequency compensating network 50 is a particularly suitable place for extracting these responses R. The disturbance initiating pulses from terminal P are also applied to a gating circuit 53 operative to close input paths 54 and 55 to a comparator 56. These paths 54 and 55 carry the disturbance and response signals D and R, respectively, and are gated to pass the first polarity excursion of the bipolar disturbance and to receive the corresponding opposite polarity response of the system. This is shown by the shading in the first pulse patterns of the second and third lines of FIG. 3 which shows time relationships with the gating action of the initiating square pulses in the first line of the Figure.

The comparator 56 has its output applied to an integrator 57 which controls the gain of a variable gain d.c. amplifier 58 shown preceding the demodulator 49 in the servo loop. In effect, then, the output of the integrator at the end of a pulse P will represent the difference in the area shown shaded in lines D and P of FIG. 3 for the first disturbance. If these two areas are equal, the gain of the amplifier 58 will be the same at the end of the corresponding pulse P as it was at the start, indicating that no other significant gain variation is taking place in the system. In this way the speed with which the servo loop responds to an unavoidable change of sensitivity (gain) is greatly increased and allows a larger range of such variations to be compensated.

Embodiments of the invention are equally applicable to other parameters of a control system that are subject to unavoidable variations, for example where these are variations characteristic of mechanical couplings during operation of a controlled system. In a moving map display system, or a recording tape transport, involving reel to reel transfer of a film, there may be large changes in inertia as effective diameters of the reels vary.

What we claim is:

1. A servo control system comprising a feedback loop including means for supplying an error signal representing the difference between actual and desired conditions of a controlled system, means responsive to the error signal to produce a control signal for said controlled system, means for applying to the feedback loop discrete signals each comprising a first excursion of one polarity providing a disturbance signal and a second excursion of opposite polarity to substantially cancel the effects of the disturbance signal on the system, means for extracting from the loop a loop response signal, comparison means for comparing the disturbance signal and the loop response signal and means responsive to the output of the comparison means to vary the gain in the feedback loop.

2. A system according to claim 1, wherein said disturbance signal is applied at regular intervals, and further comprising means, connected between the comparing means and the gain varying means, for sampling the means for comparing at instants related to those intervals.

3. A system according to claim 2, further including means for supplying a pulse train, and wherein the means for applying discrete signals includes means for differentiating said supplied pulses so as to provide a bipolar signal having said first excursion of one polarity and said second excursion of opposite polarity.

4. A system according to claim 3 wherein said means for differentiating said supplied pulses is a capacitor to said comparison means for applying thereto said signals of one polarity.

5. A system according to claim 4 wherein said connecting means includes a gating circuit operative to close first and second input paths to said comparitor, said gating circuit being operative in response to the pulses of said pulse train.

6. A system according to claim 5 wherein said first input path establishes the connection between said capacitor and a first input of said comparison means and said second input path establishes a connection between the point in said loop where the loop response signal is extracted and a second input of said comparison means.

7. A system according to claim 3 wherein the gain varying means includes an integrator coupled to the output of said comparison means and an amplifier controlled by the output of the integrator.

8. A system according to claim 7 wherein said control signal producing means includes an amplifier.

9. A method of controlling a servo loop, comprising the steps of injecting a discrete temporary distrubance signal of predetermined short duration into a loop output control signal, said temporary disturbance signal corresponding to the positive excursion of a differentiated pulse signal of predetermined rate and duration synchronously detecting a corresponding loop response signal comparing the disturbance signal and a loop response signal extracted from the loop and varying overall loop gain in accordance with an output signal derived from a comparison between said disturbance signal and the loop response signal.

* * * * *